(12) United States Patent
Drahos et al.

(10) Patent No.: US 9,260,332 B2
(45) Date of Patent: Feb. 16, 2016

(54) METHODS OF IMPROVING THE YIELD AND/OR QUALITY OF AQUATIC OR MARINE ANIMALS

(75) Inventors: David Drahos, Roanoke, VA (US); Matt Tatarko, Radford, VA (US)

(73) Assignee: Novozymes Biologicals, Inc., Salem, VA (US)

( * ) Notice: Subject to any disclaimer, the term of this patent is extended or adjusted under 35 U.S.C. 154(b) by 2037 days.

(21) Appl. No.: 12/099,877

(22) Filed: Apr. 9, 2008

(65) Prior Publication Data

US 2008/0254000 A1 Oct. 16, 2008

Related U.S. Application Data

(60) Provisional application No. 60/911,718, filed on Apr. 13, 2007.

(51) Int. Cl.
*C02F 3/34* (2006.01)
*C02F 1/72* (2006.01)
*A01K 61/00* (2006.01)
*C02F 103/20* (2006.01)

(52) U.S. Cl.
CPC .............. *C02F 3/345* (2013.01); *A01K 61/00* (2013.01); *C02F 3/341* (2013.01); *C02F 1/72* (2013.01); *C02F 3/348* (2013.01); *C02F 2103/20* (2013.01); *C02F 2209/04* (2013.01); *C02F 2209/06* (2013.01); *C02F 2209/22* (2013.01); *C02F 2209/36* (2013.01); *Y02W 10/37* (2015.05)

(58) Field of Classification Search
CPC .... C12N 15/1037; C12N 15/00; C12N 15/70; C12N 15/74; C12N 15/52; C12N 1/20; C12N 9/0008; C12N 9/0036; C12N 9/1007; C12N 9/93; C12N 15/87; C40B 40/02; G01N 33/5005; G01N 33/543; G01N 33/5432; G01N 33/60; Y02E 50/343; Y02E 50/17; Y02E 50/10; Y02E 50/13; C12P 7/00; C12P 5/02; C12P 7/04; C12P 7/18; C12P 7/26; C12P 7/06; C12P 3/00; C12P 7/065; C12P 7/16; C12P 19/02; C12P 39/00; C12P 5/00; C12P 5/023

See application file for complete search history.

(56) References Cited

U.S. PATENT DOCUMENTS

| | | | |
|---|---|---|---|
| 5,876,990 | A | 3/1999 | Reddy et al. |
| 6,410,305 | B1 | 6/2002 | Miller et al. |
| 7,160,712 | B2 | 1/2007 | Christiansen |
| 2005/0145563 | A1 | 7/2005 | Boyd et al. |

FOREIGN PATENT DOCUMENTS

| | | |
|---|---|---|
| WO | WO 98/51786 | 11/1998 |
| WO | WO 2005/033019 | 4/2005 |

*Primary Examiner* — Debbie K Ware
(74) *Attorney, Agent, or Firm* — Elias Lambiris

(57) ABSTRACT

Methods of treating aquatic or marine animal water bodies including contacting the water body with one or more sulfur oxidizing bacteria such as those selected from the genus *Paracoccus* in an amount sufficient to control, reduce, or eliminate the $H_2S$ in the water body is disclosed. One or more sulfur oxidizing bacteria selected from the genus *Paracoccus* are applied to $H_2S$ contaminated environments in a predetermined amount effective in improving the yield and quality of aquatic or marine animals therein. Compositions useful for treating aquatic or marine animal water bodies are also described.

28 Claims, No Drawings

METHODS OF IMPROVING THE YIELD AND/OR QUALITY OF AQUATIC OR MARINE ANIMALS

CROSS-REFERENCE TO RELATED APPLICATIONS

This application claims priority or the benefit under 35 U.S.C. 119 of U.S. provisional application No. 60/911,718 filed Apr. 13, 2007, the contents of which are fully incorporated herein by reference.

BACKGROUND

1. Technical Field

This disclosure relates to water treatment in general and to methods of controlling hydrogen sulfide in aquatic and marine environments. The methods are useful for application to aquatic or marine animal ponds and sediments in need of treatment to control, minimize and/or eliminate hydrogen sulfide ($H_2S$) to promote the yield and/or quality of aquatic and marine animals.

2. Background

Many aquatic and marine environments such as fish farms, pools, ponds, waste lagoons, lakes, estuaries, and oceans contain one or more aerobic zones and one or more anaerobic zones in the water column. In aerobic zones near the surface of the water column, air and winds introduce oxygen and aerobic bacteria produce, inter alia, phosphates, carbon dioxide and ammonia. In anaerobic zones near the bottom of the water column, anaerobic microorganisms tend to generate, inter alia, hydrogen sulfide, ammonia, and methane. Hydrogen sulfide accumulations in the anaerobic zones and sediments below are toxic and undesirable for they stress the aquatic and marine animal populations. In some cases, such as commercial fish and shrimp ponds, where populations live on or near the bottom of the water body in or near the anaerobic zone, the accumulation of hydrogen sulfide decreases the yield of the population and/or quality of individuals thereof.

There are several approaches to problems associated with the anaerobic zones known in the art. For example, chemical oxidizers, such as ozone, chlorine dioxide, and hydrogen, calcium, or magnesium peroxide, may be added to the water body to alleviate the anaerobic conditions. Although these methods may be effective, they may be expensive, pressuring users to minimize the amount of oxidizers added to the water body. The need to economize can be detrimental if it leads to under dosing. Under dosing is problematic in that it can cause incomplete or partial oxidation, creating odor problems. When chlorine dioxide is added to organic acids, incomplete oxidation can cause the formation of chloroacetic acid, which has a foul odor noticeable at very low concentrations. However, these steps are designed to eliminate odor and may be detrimental to the aquatic and marine animals in the environment such as shrimp or fish.

Other known methods for controlling hydrogen sulfide include treating water with oxygen. For example, U.S. Pat. No. 5,876,990 describes a biochemical media system for reducing pollution. The system includes a first media which provides an oxygen inducer to dissipate slowly into aqueous surroundings, and a second media which provides an oxygen supplier. The two media are combined in aqueous environment to generate nascent oxygen at a modulated rate such that the oxygen is absorbed into the surrounding aqueous environment, promoting growth of aerobic species and reducing biological pollution. However, the use of such a system does not necessarily alter the hydrogen sulfite concentration in the sediment below the water column and may also be detrimental to the aquatic and marine animals in the environment. Moreover, the cost of such a treatment may well outweigh the potential economic benefit of this for fish or shrimp farming.

Of interest is U.S. Pat. No. 7,160,712 (herein incorporated by reference in its entirety) which relates to methods for treating odors in wastewater treatment bodies. Here, odor problems are treated by altering the water chemistry to make the reduction of sulfur chemical species thermodynamically unfavorable, and bacteria, such as *Paracoccus pantotrophus* are added to the water. However, there is no suggestion to use such methods for improving the yield and/or quality of aquatic and marine animals such as in commercial fish farms.

Other methods of reducing hydrogen sulfide levels in a contaminated aquaculture include partial water exchange. However flushing methods may be impractical, expensive, and potentially dangerous if flush water introduces contaminants such as viruses and/or disease.

While chemicals and water flushing may be effective against hydrogen sulfide, these measures are expensive and may lead to a reduced yield and/or quality of aquatic or marine animals grown therein. It is thus desirable to have an effective, more problem free, biological or biochemical system that controls hydrogen sulfide accumulations in aquatic or marine environments and sediments thereof.

SUMMARY

It has been found that aquatic and marine animal yield and/or quality can be improved by treating an anaerobic condition in a water body and/or sediment thereof. The treatments include adding an effective amount of one or more sulfur oxidizing bacteria such as those selected from the genus *Paracoccus* to the water body and/or to the pond sediment. Such sulfur oxidizing bacterial are capable of oxidizing sulfide, ($S^{2-}$) to elemental sulfur ($S^0$), ($S^{4+}$) which exists as sulfite ($SO_3^{2-}$), or ($S^{6+}$) which exists as sulfate $SO_4^{2-}$. In embodiments, the treatment further includes one or more steps which alter the water chemistry to make the reduction of sulfur chemical species thermodynamically unfavorable.

The present disclosure provides one or more novel methods for treating a water body and/or sediment by contacting the water body and/or sediment thereof with an effective amount of one or more sulfur oxidizing bacteria selected from the genus *Paracoccus*.

The present methods are suitable where the hydrogen sulfide forms in a water body and/or sediment layer near the bottom of a water body, and in embodiments where sufficient amounts of nitrate are available to act as an electron acceptor. Suitable water bodies include aquacultures, pools, ponds, paddies, fish farms, lakes, streams, rivers, oceans, estuaries, waste lagoons, contaminated portions thereof, and combinations thereof.

In embodiments, a method of treating aquatic or marine animals includes contacting a water body or sediment thereof, or in need of treatment or decontamination, with one or more sulfur oxidizing bacteria selected from the genus *Paracoccus* in an amount sufficient to control, reduce, or eliminate the $H_2S$ in the water body or sediment. In embodiments, the amount of sulfur oxidizing bacteria is sufficient to establish a concentration of the sulfur oxidizing bacteria in the sediment in an amount of about 100 CFU/g to about 100,000 CFU/g. In embodiments, the amount of sulfur oxidizing bacteria is sufficient to establish a concentration of the sulfur oxidizing bacteria in the water body in an amount of about 100 CFU/ml to about 100,000 CFU/ml. The water body may be an aquaculture farm, pool, pond, waste lagoon, lake, estuary, ocean, contaminated portion thereof, or combinations thereof. In embodiments, suitable methods may include the step of modifying the chemistry of the water body by establishing a concentration of nitrates in the water body at about 0.01 ppm to about 500 ppm, or a concentration of nitrates in the water body at about 1.0 ppm to about 250 ppm, or a concentration of nitrates in the water body at about 0.01 ppm to about 10 ppm For example, the chemistry of the water body may be modified by establishing a concentration of nitrates in the water body at 200 ppm or about 200 ppm. Such methods may also include the step of stocking a water body with aquatic or marine animals such as fish, shrimp, lobster, cray fish, bottom dwelling fish, finfish, prawns, oysters, mussels, cockles, Mollusks, and combinations thereof. In embodiments, the effective amount of sulfur oxidizing bacteria is an amount sufficient to maintain $H_2S$ below 1 part-per-million (ppm) for at least 1 week. In embodiments, the amount of *Paracoccus* is 0.01 ppm to 500 ppm. Additional microorganisms can also be added in accordance with the present disclosure.

In embodiments, a method for increasing aquatic and marine animal yield in a water body includes: reducing the amount of $H_2S$ in a water body and sediment thereof by establishing a sulfur oxidizing bacteria population selected from the genus *Paracoccus* (including but not necessarily limited to *Paracoccus pantotrophus*) in the water body in an amount of 100 CFU/ml to 100,000 CFU/ml and in the sediment is an amount of 100 CFU/g to 100,000 CFU/g; and modifying the chemistry of the water body by establishing a concentration of nitrates in the water body at 0.01 ppm to 500 ppm. Such methods may include the step of modifying the chemistry of the water body including establishing an oxidation reduction potential level in the water body or in the sediments of the water body of at least about –330 mV, wherein the final amount of $H_2S$ in the water body is below 1 part-per-million. In embodiments, the final amount of $H_2S$ in the water body or sediments is below 0.5 part-per-million, 0.4 part-per-million, or 0.3 part-per-million. In embodiments, the final amount of $H_2S$ in the water body or sediments is in an amount of 0.1 part-per-million to 0.5 part-per-million. In embodiments, the methods include establishing a pH in the water body of about 6.0 to 8.5. In embodiments, the yield is increased in comparison to a similar or substantially similar water body having no sulfur oxidizing bacteria added thereto in accordance with the present disclosure.

In embodiments, a method for increasing aquatic and marine animal quality or yield in a water body includes: reducing the amount of $H_2S$ in a water body by establishing a sulfur oxidizing bacteria population selected from the genus *Paracoccus* in the water body in an amount of about 100 CFU/ml to about 100,000 CFU/ml; and modifying the chemistry of the water body by establishing a concentration of nitrates in the water body at about 1 ppm to about 250 ppm, wherein the final amount of $H_2S$ in the water body is in an amount of 0.1 part-per-million to 0.5 part-per-million. In embodiments, such methods further include the step of stocking the water body with aquatic or marine animals selected from the group consisting of fish, shrimp, lobster, eel, crayfish, bottom dwelling fish, finfish, prawns, oysters, mussels, cockles, Mollusks, and combinations thereof. Methods in accordance with the present disclosure are suitable for increasing the yield and quality of any organism grown in an aquaculture including but not limited to fish and/or plants. In embodiments, such methods include the step of pulsing sulfur oxidizing bacteria into the water body in order to obtain the initial concentration of bacteria in the water body in an amount of about 100 CFU/ml to about 100,000 CFU/ml until harvest of the aquatic or marine animals or other desirable beneficial manifestation.

In embodiments, the present disclosure includes one or more compositions for treating aquatic and marine animals comprising a predetermined amount of *Paracoccus pantotrophus*.

Embodiments of the present disclosure include one or more admixtures of microorganisms which used in combination, reduce, eliminate or control $H_2S$ in a water body or sediment. For example, admixtures containing predetermined amounts of *Paracoccus pantotrophus* in combination with one or more additional microorganisms are disclosed.

In embodiments, compositions in accordance with the present disclosure comprise or consist of at least one additional microorganism which comprises or consists of *Bacillus alkalophilus, Bacillus brevis, Bacillus coagulans, Bacillus circulans, Bacillus clausii, Bacillus lichenifonnis, Bacillus lentus, Bacillus amyoliquofaciens, Bacillus lautus, Bacillus megaterum, Bacillus subtilus, Bacillus stearothermophilus, Bacillus pumilus, Bacillus pasteunfi, Bacillus Thuringiensis*, or combinations thereof. In embodiments, compositions in accordance with the present disclosure comprise or consist of one of the above *Bacillus*, wherein *Paracoccus* such as *Paracoccus pantotrophus* and *Bacillus* are combined to form an admixture characterized by a weight ratio in the amount of 4:1 to 1:4. In embodiments, compositions in accordance with the present disclosure comprise or consist of *Bacillus megatenum*, wherein *Paracoccus pantotrophus* and *Bacillus megateium* are combined to form an admixture characterized by a weight ratio in the amount of 4:1 to 1:4.

In embodiments, the present disclosure relates to methods of treating aquatic or marine animals comprising: contacting a water body or sediment thereof with one or more sulfur oxidizing bacteria in an amount sufficient to control, reduce, or eliminate the $H_2S$ in the water body or sediment. The one or more sulfur oxidizing bacteria may be admixed with other bacteria such as *Bacillus* depending upon the goals of the treatment and water conditions. The admixture can be made in various weight/weight ratios.

Methods of controlling, reducing and/or minimizing hydrogen sulfide by contacting a water body and/or sediment with *Paracoccus pantotrophus* alone or in combination with other bacteria are also disclosed, along with suitable formulations for use in accordance with the present disclosure.

DETAILED DESCRIPTION OF PREFERRED EMBODIMENTS

In anaerobic zones near the bottom of the water column or in the bottom sediment, anaerobic microorganisms such as sulfate reducing bacteria (SRB's) tend to generate, interalia, hydrogen sulfide, ammonia, and methane. For example, sulfur reducing bacteria (SRB) reduce the sulfur in sulfate $(SO_4^{2-})$ $(S^{6+})$ to $(S^{2-})$ containing compounds as a terminal electron acceptor and produce hydrogen sulfide $(H_2S)$ in the process. Hydrogen sulfide $(H_2S)$ accumulations in aquatic and marine animal waters and bottom sediments, such as commercial aquaculture ponds, stress and kill the aquatic and marine animals such as shrimp, certain fish such as bottom dwelling fish, lobster, and crayfish, or any aquaculture organism(s) which may tend to stay at the bottom of the water body. In order to increase aquatic and marine animal yield and/or quality, toxic or increased accumulations of $H_2S$ in the anaerobic layer and/or sediments below can be controlled, reduced and/or eliminated. Thus, it has now been found that aquatic and marine animal yield and/or quality can be improved by adding an effective amount of sulfur oxidizing bacteria such as *Paracoccus pantotrophus* to a water body or bottom sediments. In embodiments, the treatment further includes one or more steps which alter the water chemistry to make the reduction of sulfur chemical species unfavorable.

Accordingly, the present disclosure provides methods and compositions for treating aquatic and marine environments suitable for growing aquatic and marine animals. The methods include applying a predetermined amount of sulfur oxidizing bacteria such as *Paracoccus pantotrophus* to an area in need of control or treatment such as an $H_2S$ contaminated area. The sulfur oxidizing bacteria may be in solution and made available to reduce, control and/or eliminate $H_2S$. In embodiments, suitable treatments include the addition of bacteria, such as *Paracoccus pantotrophus* (formerly called *Thiosphaera pantotropha*), capable of oxidizing sulfide, ($S^{2-}$) to elemental sulfur ($S^0$), ($S^{4+}$) which exists as sulfite ($SO_3^{2-}$), or ($S^{6+}$) which exists as sulfate $SO_4^{2-}$. In one embodiment, *Paracoccus pantotrophus* (ATCC strain 35512, LMD (Delft Collection of Microorganisms) 82.5) is added alone in an effective amount to treat a contaminated water body and/or sediment.

Suitable non-limiting examples of sulfur oxidizing bacteria for use in accordance with this disclosure include one or more bacteria selected from the genus *Paracoccus*. Non-limiting examples of suitable *Paracoccus* include: *P. alcaliphilus, P. alkenifer, P. aminophilus, P. aminovorans, P. cartinifaciens, P. denittificans, P. kocuii, P. marcusii, P. methylutens, P. pantotrophus, P. solventivorans, P. thiocyanatus, P. versustus*, and combinations thereof. In embodiments, solely the use of *P. pantotrophus* is suitable for use in accordance with the present disclosure. In embodiments, a combination of *P. pantotrophus* and one or more other *Paracoccus* is suitable for use in accordance with the present disclosure. In embodiments, any sulfur oxidizing bacteria and/or combinations thereof may be suitable for use in accordance with the present disclosure. For example, a combination of *P. pantotrophus* and one or more sulfur oxidizing bacteria may be suitable for use in accordance with the present disclosure.

Additional non-limiting examples of suitable combinations include *P. pantotrophus* in combination with *P. alcaliphilus; P. pantotrophus* in combination with *P. alkenifer, P. pantotrophus* in combination with *P. aminophilus; P. pantotrophus* in combination with *P. aminovorans; P. pantotrophus* in combination with *P. cartinifaciens; P. pantotrophus* in combination with *P. denitrificans; P. pantotrophus* in combination with *P. kocuri; P. pantotrophus* in combination with *P. marcusli; P. pantotrophus* in combination with *P methylutens; P. pantotrophus* in combination with *Bacillus megaterium; P. pantotrophus* in combination with *P. solventivorans; P. pantotrophus* in combination with *P. thiocyanatus; P. pantotrophus* in combination with *P. versustus*.

Other suitable combinations include of *P. pantotrophus* in combination with two other types of bacteria. For example, *P. pantotrophus* in combination with *P. alcaliphilus* and *P. alkenifer, P. pantotrophus* in combination with *P. alkenifer* and *P. aminophilus; P. pantotrophus* in combination with *P. aminovorans* and *P. carinifaciens; P. pantotrophus* in combination with *P. denitrificans* and *P. kocurii; P. pantotrophus* in combination with *P. marcusli* and *P methylutens; P. pantotrophus* in combination with *P. pantotrophus* and *P. solventivorans; P. pantotrophus* in combination with *P. thiocyanatus* and *P. versustus*. Other combinations of *P. pantotrophus* with two bacteria would readily be envisioned by one of skill in the art.

Other suitable combinations include of *P. pantotrophus* in combination with three other bacteria. For example, *P. pantotrophus* in combination with *P. alcaliphilus, P. alkenifer* and *P. aminophilus; P. pantotrophus* in combination with *P. aminovorans, P. cartinifaciens* and *P. denittificans; P. pantotrophus* in combination with *P. marcusii, P. kocurii* and *P methylutens; P. pantotrophus* in combination with *P. solventivorans, P. thiocyanatus* and/or *P. versustus*. Other combinations of *P. pantotrophus* with three bacteria would readily be envisioned by one of skill in the art.

Other suitable combinations include *P. pantotrophus* in combination with four, five, six, seven, eight, nine, ten, eleven, twelve, thirteen, fourteen, fifteen, etc. other types of bacteria. Other combinations of *P. pantotrophus* with multiple bacteria would readily be envisioned by one of skill in the art.

In embodiments, one or more sulfur oxidizing bacteria such as those selected from the genus *Paracoccus* can be applied to one or more water bodies to control, minimize and/or eliminate undesirable $H_2S$ to promote aquatic and/or marine animal populations. As used herein the word "treat," "treating" or "treatment" refers to using the bacteria in accordance with the present disclosure such as those selected from the genus *Paracoccus* prophylactically to prevent $H_2S$ buildup which may have a detrimental effect on aquatic and/or marine animal populations, or to ameliorate an existing $H_2S$ contamination having a detrimental effect on aquatic and/or marine animal populations. A number of different treatments are now possible, which promote the yield and quality of aquatic and/or marine animal populations such as shrimp, lobster, cray fish, bottom dwelling fish, organisms suitable for aquaculture, and combinations of aquatic and/or marine animal populations.

The mode of action of sulfur oxidizing bacteria is known and is further described in U.S. Pat. No. 7,160,712 (herein incorporated by reference in its entirety). Although not wishing to be bound by any disclosure including the present disclosure, it is believed that sulfur oxidizing and sulfur reducing bacteria use soluble organic matter measured in terms of five day biochemical oxygen demand or $BOD_5$ as an energy source. Some bacteria, such as *Paracoccus* can use reduced sulfur compounds (i.e., $H_2S$), as their energy source. When sufficient amounts are not available in the water body, such bacteria also need an electron acceptor to metabolize the energy sources. The nature of the electron acceptor present in the water often promotes the microbial culture that thrives in the environment. The most energetically favorable reaction in water is usually the reduction of oxygen ($O_2$) to water ($H_2O$). The presence of dissolved oxygen in the water will often allow bacteria that are not capable of using sulfur compounds as a terminal electron acceptor to metabolize the organic matter in the water. Additionally, most sulfur reducing bacteria are capable of using oxygen rather than sulfur as the terminal electron acceptor, and will use oxygen when sufficient amounts are available in the water. When there is insufficient oxygen present, sulfur reducing bacteria use the sulfur in sulfate $SO_4^{2-}$ containing compounds as the terminal electron acceptor and produce hydrogen sulfide ($H_2S$) in the process.

As used herein "$H_2S$ contamination" refers to any detectable $H_2S$ manifestation(s). Such manifestations can be caused by a number of factors such as, for example, type and amount of bacteria present, water column nutrient levels, dissolved oxygen levels and/or other stressed or dysfunctional environmental states. Non-limiting examples of such manifestations include the development of anaerobic bacterial growths, stress and/or kills on aquatic and fish populations, and/or forms of reduced aquatic and marine animal quality such as reduced size or shape of the animals. For example, manifestations include reduced yields and quality of bottom dwelling animals such as fish, shrimp, lobster, bottom dwelling fish, aquaculture organism, or crayfish that live in or near anaerobic zones. It is understood, that the manifestations are non-limiting and that only a portion of the manifestations suitable for treatment in accordance with the present disclosure are listed herein.

In embodiments, compositions for use in accordance with the present disclosure contain one or more sulfur oxidizing bacteria such as those selected from the genus *Paracoccus* in an effective amount to improve water conditions and/or alleviate any detrimental manifestations of $H_2S$. As used herein "effective amount" refers to an amount of sulfur oxidizing bacteria sufficient to induce a particular positive benefit to aquatic or marine animal populations such as increased yield of the total population and/or size and quality of individual organisms in the population. The positive benefit can be cosmetic in nature where the organism looks bigger or healthier on the outside, or health-related, or a combination of the two. In embodiments, the positive benefit is achieved by contacting an $H_2S$ contaminated aquatic environment with a combination of bacteria such as those from the genus *Paracoccus* to improve aquatic or marine animal yield and/or quality. Treatments include contacting $H_2S$ contaminated aquatic environments with an amount of bacteria selected from the genus *Paracoccus* effective to eliminate $H_2S$, and/or reduce $H_2S$ to levels not immediately toxic or detrimental to aquatic or marine animals, for example, to less than 0.03 ppm in the pH range of 6.0-9.0 in a water body and/or sediments immediately below the water column. In embodiments, the final amount of $H_2S$ in the water body or sediment is an amount of 0.01 part-per-million to 0.5 part-per-million, or an amount of 0.1 part-per-million to 0.5 part-per-million.

The particular sulfur oxidizing bacteria concentration applied generally depends on the purpose for which the bacteria are to be applied. For example, the dosage and frequency of application can vary depending upon the type and severity of the $H_2S$ contamination. In embodiments, one or more sulfur oxidizing bacteria such as those bacteria selected from the genus *Paracoccus* are applied to a water body in an amount sufficient to establish the concentration the sulfur oxidizing bacteria in the water body at about 100 to 100,000 CFU/ml, or in the bottom sediment at about 100 to 100,000 CFU/g. In some embodiments, one or more sulfur oxidizing bacteria such as those bacteria selected from the genus *Paracoccus* are applied to a water body in an amount sufficient to establish the concentration the sulfur oxidizing bacteria in the water body at about 1000 CFU/ml to 10,000 CFU/ml, or in the bottom sediment at about 1000 CFU/g to 10,000 CFU/g. In embodiments, one or more sulfur oxidizing bacteria such as those bacteria selected from the genus *Paracoccus* are applied to a water body in an amount sufficient to establish the concentration the sulfur oxidizing bacteria in the water body at about 5000 CFU/ml to 10,000 CFU/ml, or in the bottom sediment at about 5000 CFU/g to 10,000 CFU/g. As used herein CFU/ml relates to colony forming units per milliliter, and CFU/g refers to colony forming units per gram.

In embodiments, one or more sulfur oxidizing bacteria such as those bacteria selected from the genus *Paracoccus* are applied to a water body in an amount sufficient to establish the concentration the sulfur oxidizing bacteria in the water body, or contaminated portion thereof in an amount of at least about 0.01 to 500 ppm, or an amount of at least about 0.1 to 250 ppm, or an amount of 0.1 to 100 ppm, or an amount of 0.1 to 50 ppm, or an amount of 0.1 to 10 ppm. In embodiments, one or more sulfur oxidizing bacteria such as those bacteria selected from the genus *Paracoccus* are applied to a water sediments in an amount sufficient to establish the concentration the sulfur oxidizing bacteria in the sediment, or contaminated portion thereof in an amount of at least about 0.01 to 500 ppm, or an amount of at least about 0.1 to 250 ppm, or an amount of 0.1 to 100 ppm, or an amount of 0.1 to 50 ppm, or an amount of 0.1 to 10 ppm. In some embodiments, sulfur oxidizing bacteria such as *Paracoccus pantotrophus* (ATCC strain 35512, LMD (Delft Collection of Microorganisms) is established in the water in need of treatment in an amount of 0.01 ppm to about 500 ppm. In some embodiments, sulfur oxidizing bacteria such as *Paracoccus pantotrophus* (ATCC strain 35512, LMD (Delft Collection of Microorganisms) is established in the sediment in an amount of 0.01 ppm to about 500 ppm.

In embodiments, sulfur oxidizing bacteria for use in accordance with this disclosure may be added to a water body in pulse applications. For example, bacteria such as *Paracoccus pantotrophus* may be applied to the treated ponds by pulsing on an hourly, daily, and/or weekly application to maintain the concentration at a predetermined or target amount. For example, sulfur oxidizing bacteria may be applied as a dry formulation containing $3.5 \times 10^9$ CFU/g, in amounts and intervals to maintain the overall amount of *Paracoccus* to be established or maintained at an amount of 100 to 100,000 CFU/ml every 1 to 7 days until treatment goals obtained and/or harvest, and in some embodiments, about 10 to 100,000 CFU/ml every 7 days until goals obtained or harvest.

The one or more sulfur oxidizing bacteria may be added to the influent of a pond, lagoon, or other water body. In large water bodies such as a lagoon, it may be desirable to broadcast the sulfur oxidizing bacteria over the water body in order to avoid waiting for the sulfur oxidizing bacteria to disperse throughout the water body. Aircraft, watercraft, shore based spraying units, and other conventional means of broadcasting may be used to apply the sulfur oxidizing bacteria to the water body. Rather than adding the sulfur oxidizing bacteria to the entire water body, it may be desirable to add it to areas in the water body where the anaerobic condition is located.

In embodiments, the one or more sulfur oxidizing bacteria can be used in combination with other microorganisms. Non-limiting examples of suitable microorganisms include on or more microorganisms selected from the group consisting of the genera *Acinetobacter, Aspergillus, Azospirillum, Burkholdeda, Bacillus, Cedporiopsis, Enterobacter, Escherichia, Lactobacillus, Paenebacillus, Pseudomonas, Rhodococcus, Syphingomonas, Streptococcus, Thiobacillus, Trichoderma, Xanthomonas*, and combinations thereof. Non-limiting examples of suitable microorganisms from the *Bacillus* genera may be selected from the group consisting of *Bacillus alkalophilus, Bacillus brevis, Bacillus coagulans, Bacillus circulans, Bacillus clausii, Bacillus lichenifonnis, Bacillus lentus, Bacillus amyoliquofaciens, Bacillus lautus, Bacillus megaterum, Bacillus subtilus, Bacillus stearothermophilus, Bacillus pumilus, Bacillus pasteuni, Bacillus thuringiensis*, or combinations thereof. For example, *Bacillus megaterium* having all of the characteristics of strain SB-3112, ATCC PTA-3142 and described in U.S. Pat. No. 6,649,401 (herein incorporated by reference in its entirety) may be used in combination with the sulfur oxidizing bacteria in accordance with the present disclosure. *Paracoccus* such as *Paracoccus pantotrophus* and these other microorganisms can be mixed in various weight ratios depending upon treatment goals and conditions. For example, *Paracoccus* can be admixed with one other microorganism to make a formulation characterized by a range of ratios (wt/wt.) of 10:1 to 1:10, for example: 9:2, 8:3, 7:4, 6:5, 5:6, 4:7, 3:8, 2:9, or 1:10.

In embodiments, the one or more sulfur oxidizing bacteria for use in accordance with the present disclosure may be mixed to form an admixture with other compositions such as PondPlus® brand *Bacillus* consortium and/or PondProtect® brand Nitrifier consortium both available from Novozymes.

In some embodiments, an admixture of sulfur oxidizing bacteria such as *Paracoccus pantotrophus* (ATCC strain 35512, LMD (Delft Collection of Microorganisms) in combination with *Bacillus* megaterium is established in the water or sediment in need of treatment in an amount of 0.01 ppm to about 500 ppm. Non-limiting examples of suitable admixture compositions for use in accordance with the present disclosure include a composition comprising, or consisting of *Paracoccus pantotrophus* and *Bacillus megaterium* as discussed above, in the range of ratios (wt/wt.) of 10:1 to 1:10, for example: 9:2, 8:3, 7:4, 6:5, 5:6, 4:7, 3:8, 2:9, or 1:10, and in one embodiment 1.5 to 2.5. Other suitable admixture ratios would be readily envisioned by one of ordinary skill in the art, including but not limit to weight ratios of 4:1 to 1:4.

In embodiments, treatments further include one or more steps which alter the water or bottom sediment chemistry to make the reduction of sulfur chemical species unfavorable. For example, where it is found that water or bottom sediment in need of treatment does not initially have chemicals suitable for serving as the terminal electron acceptor, one or more oxidizing agents, whose reduction is more energetically favorable than the reduction of sulfate, can be added to the water body. In embodiments, treatments are directed towards the bottom sediment as a prime target where the anaerobic zone is present and $H_2S$ is generated. In embodiments, the application of sulfur oxidizing bacteria such as those selected from the genus *Paracoccus* may be applied alone or in combination with one or more oxidizing agents suitable for acting as electron acceptors. In embodiments, suitable oxidizing agents are chemicals that most sulfur reducing bacteria cannot use as an electron acceptor. Non-limiting examples of suitable oxidizing agents include chemicals containing a nitrate ($NO_3^-$) constituent which can be biologically reduced to nitrogen gas $N_2$ and/or hydrogen peroxide $H_2O_2$ which can then be biologically reduced to water. The addition of one or more oxidizing agents to the water body, which will also become present in the bottom sediment in combination with bacteria (initially present or added), will change the oxidation reduction potential (ORP) of the bottom sediments. The target ORP range in the bottom sediments is about −330 mV to +100 mV. In embodiments, low ORP will likely develop over time after the addition of the *Paracoccus* material. Further, in embodiments, microbes are added in anticipation of the $H_2S$ development, and will exist in the water and sediment on other nutrient sources, even aerobically, until conditions for $H_2S$ generation occurs.

Suitable non-limiting examples of one or more oxidizing agents for use in accordance with the present disclosure include oxygen $O_2$, ozone $O_3$, peroxides such as hydrogen peroxide $H_2O_2$, calcium peroxide $CaO_2.H_2O$, magnesium peroxide $MgO_2H_2O$, nitrates $R(NO_3)_x$, nitrites $RNO_2$, permanganate $KMnO_4$, potassium dichromate $K_2Cr_2O_7$, potassium chlorate $KClO_3$, and/or chlorine dioxide $ClO_2$, and combinations thereof. In embodiments, $NO_3$ which can be biologically reduced to nitrogen gas $N_2$ is suitable for use in accordance with the present disclosure. $NO_3$ use is also appropriate for many aquacultural applications where nitrate is present in sufficient quantities due to the normal process of nitrification. In embodiments, suitable oxidizing agents include one or more nitrate salts, such as sodium nitrate $NaNO_3$, used alone or in combination with calcium nitrate $Ca(NO_3)_2.4H2O$.

Although the present disclosure describes the increase in ORP in terms of the chemicals added, this is largely a biochemical process. The addition of alternative electron acceptors allows bacteria to change the ORP of the water and/or sediment. Where the bacteria present in the system are incapable of reducing nitrate (or other alternate electron acceptors) or of oxidizing sulfur, adding them is appropriate to facilitate reduction of the electron acceptors and thereby allow the ORP to be increased. At the increased ORP's, the reduction of sulfur is no longer as thermodynamically advantageous for bacteria, and bacteria more efficient at using other electron acceptors will predominate over bacteria particularly suited to using sulfur.

In addition to changing ORP, it may be desirable to alter the pH. The pH may be altered to any appropriate level such as that determined by the farmer to that which is optimal for animal growth in a particular aquaculture. In embodiments, the target pH is about 6.0 to about 9.0 including pH 6.0 to pH 9.0. Accordingly, pH adjustors can be added in an amount sufficient to alter the pH of the water body to a pH of about 6.0 to about 8.5. The target ORP and the target pH values are inversely related; the lower the pH, the higher the desired ORP levels and vice versa.

Where there are few oxidizing agents initially present in a water body prior to treatment, large doses of oxidizing agent may be added to the water body. The specific amount needed may be calculated for each water body. The necessary quantity will depend upon the volume of the body being treated, its current ORP, the target ORP, the concentration of any additive, temperature (which affects the equilibrium point of chemical species as well as the rate at which biological processes occur), the concentration of total organic acid, the total sulfur concentration, and the total concentration of $H_2S$ causing sulfur species. In embodiments, nitrate is established in an amount of about 0.01 ppm to about 500 ppm, or a concentration of nitrates in the water body at about 1.0 ppm to about 250 ppm, or a concentration of nitrates in the water body at about 0.01 ppm to about 10 ppm For example, the chemistry of the water body may be modified by establishing a concentration of nitrates in the water body at 200 ppm or about 200 ppm. As used herein "ppm" means part-per-million.

The oxidizing agent may be added to the influent of a water body. Rather than adding the agent to the entire water body, it may be desirable to add it to areas in the water body where the ORP is the most depressed.

After the ORP treatment, additional oxidizing agent may need to be added to the system on a maintenance basis. For example, maintenance doses of oxidizing agent may be pulsed into the water body over regular intervals such as an hourly, daily or weekly basis. In embodiments, a liquid sodium nitrate or calcium nitrate solution for maintenance doses are suitable for use in accordance with the present disclosure.

As with the initial treatment, the size of the maintenance doses needed for maintenance purposes will vary from water body to water body, and may be individually calculated. In embodiments, suitable amounts of a maintenance dose include amounts of about 1.2 mg $NO_3^-$ per liter of water volume. In embodiments, the dose is provided to maintain nitrate in an amount of about 1 ppm to about 10 ppm.

In embodiments, and after the chemicals for modifying pH and ORP have been added (if needed), sulfur oxidizing bacteria are added to the water. It is usually preferable to introduce the sulfur oxidizing bacteria immediately after the ORP chemicals have been added to the water. Where pH and ORP altering chemicals are added in large initial treatments over the course of several days, it is usually preferable to add the sulfur oxidizing bacteria after each pH and ORP treatment.

Treatments in accordance with the present disclosure contact $H_2S$ contaminated areas with bacteria selected from the genus *Paracoccus* in an effective amount to improve aquatic and marine animal populations. In embodiments, areas in need of treatment or $H_2S$ control such as pools, ponds, paddies, fish farms, lakes, estuaries, oceans, waste lagoons, are treated by applying to these areas, one or more sulfur oxidizing bacteria such as bacteria from the genus *Paracoccus* either alone or in combination with an oxidizing agent and/or pH adjustor. In embodiments, the sulfur reducing bacteria such as the bacteria selected from the genus *Paracoccus* and/or oxidizing agent are applied until the treatment goals are obtained. However, the duration of the treatment can vary depending on the severity of the condition. For example, treatments can last several days to months depending on whether the goal of treatment is to control, reduce and/or eliminate $H_2S$ contamination and/or increase the yield and/or quality of aquatic or marine animals such as shrimp, lobster, aquaculture organism and/or crayfish. After some treatments in accordance with the present disclosure, the yield of the aquatic and/or marine animals is increased in an amount of 5% to 200%. In embodiments, the yield of the aquatic and/or marine animals is increased in an amount of 10%, 20%, 30%, 40%, 50%, 60%, 70%, 80%, 90%, 100%, 150%, or 200%. After some treatments in accordance with the present disclosure, the size of the aquatic and/or marine animals is increased by 1 to 10%, including but not limited to 2%, 3%, 4%, 5%, 6%, 7%, 8%, 9% or more.

Treatments in accordance with the present disclosure include an initial assessment of a water body for growing aquatic or marine animals. Various characteristics may be measured, observed and/or established as part of the treatment process. Suitable characteristics of treatment water include: transparency, water temperature, pH, dissolved oxygen, salinity, EC, total alkalinity, hardness, total ammonia, nitrite, and/or nitrate. In embodiments, transparency may be established in the amount of about 7.0 cm to about 40 cm. In embodiments, water temperature can be established in an amount of about 23.0° C. to about 30.1° C. in the morning and/or 31.0° C. to about 33.5° C. in the afternoon. In embodiments, water body pH can be established and/or altered to about 7.00 to about 8.5. In embodiments suitable pH in the morning hours is about 7.6 to 7.9. In embodiments, suitable pH in the evening hours is about 8.2 to about 8.5. In embodiments, dissolved oxygen can be established in an amount of about 2.0 ppm to about 8.0 ppm, depending on depth and time of day. In embodiments, suitable salinity for water bodies for use in accordance with the present disclosure is in an amount of about 0.5 to 45 ppt. In embodiments, EC may be established at an amount of about 4.5 to 12 mcm/cm. In embodiments, total alkalinity may be established at an amount of about 80 ppm to about 305 ppm. In embodiments, total hardness may be established in an amount of about 750 ppm to about 1826 ppm. In embodiments, total ammonia can be established in an amount of 0.006 ppm to about 0.070 ppm. In embodiments, nitrite can be established in an amount of 0.0 to about 0.009 ppm. In embodiments, nitrate can be established in an amount of about 2.5 ppm to about 20 ppm.

In embodiments, methods of treating aquatic or marine animals such as aquacultures thereof includes contacting a water body or sediment thereof, or in need of treatment or decontamination, with one or more sulfur oxidizing bacteria in an amount sufficient to control, reduce, or eliminate the $H_2S$ in the water body or sediment. In embodiments, the amount of sulfur oxidizing bacteria is sufficient to establish a concentration of the sulfur oxidizing bacteria in the sediment in an amount of about 100 CFU/g to about 100,000 CFU/g. In embodiments, the amount of sulfur oxidizing bacteria is sufficient to establish a concentration of the sulfur oxidizing bacteria in the water body in an amount of about 100 CFU/ml to about 100,000 CFU/ml. The water body may be an aquaculture, pool, pond, paddy farm, waste lagoon, lake, estuary, ocean, contaminated portion thereof, or combinations thereof. In embodiments, suitable methods may include the step of modifying the chemistry of the water body by establishing a concentration of nitrates in the water body at about 0.01 ppm to about 500 ppm, or a concentration of nitrates in the water body at about 1.0 ppm to about 250 ppm, or a concentration of nitrates in the water body at about 0.01 ppm to about 10 ppm For example, the chemistry of the water body may be modified by establishing a concentration of nitrates in the water body at 200 ppm or about 200 ppm. Such methods may also include the step of stocking a water body with aquatic or marine animals such as fish, shrimp, lobster, crayfish, bottom dwelling fish, finfish, prawns, oysters, mussels, cockles, Mollusks, any organism suitable for aquaculture, and combinations thereof. In embodiments, the effective amount of sulfur oxidizing bacteria is an amount sufficient to maintain $H_2S$ below 1 part-per-million (ppm) for at least 1 week. In embodiments, the amount of sulfur oxidizing bacteria is 0.01 ppm to 500 ppm. Additional microorganisms can also be added in accordance with the present disclosure. Methods in accordance with the present disclosure are suitable for increasing the yield and quality of any organism grown in an aquaculture including but not limited to fish and/or plants.

The present disclosure further relates to formulations comprising sulfur oxidizing bacteria. Compositions for use in accordance with the present disclosure include compositions for treating aquatic and marine animals comprising a predetermined amount of *Paracoccus pantotrophus*. For example, 1 KG packages can be assembled containing 100% *Paracoccus pantotrophus*. Additional compositions include a predetermined amount of *Paracoccus pantotrophus* in combination with at least one additional microorganism. For example, *Paracoccus pantotrophus* can be combined with a *Bacillus* microorganism such as *Bacillus alkalophilus, Bacillus brevis, Bacillus coagulans, Bacillus circulans, Bacillus clausii, Bacillus lichenifonnis, Bacillus lentus, Bacillus amyoliquofaciens, Bacillus lautus, Bacillus megaterium, Bacillus subtilus, Bacillus stearothermophilus, Bacillus pumilus, Bacillus pasteudi, Bacillus Thuringiensis*, or combinations thereof. The composition may comprise or consist of a combination of *Paracoccus pantotrophus* and one additional microorganism in various weight ratios (wt/wt.) depending upon the desired purpose of the composition or water/sediment conditions. For example, *Paracoccus pantotrophus* and another microorganism can form an admixture characterized by a weight ratio in the amount of 4:1 to 1:4. In one embodiment, the weight ratio of *Paracoccus pantotrophus* to *Bacillus* megaterium is 1.5 to 2.5.

Suitable compositions in accordance with the present disclosure also comprise, or consist of, *Paracoccus pantotrophus* in an amount of $1 \times 10^5$ to about $11 \times 10^9$ CFU/gm, for example $3 \times 10^9$ CFU/gm. The *Paracoccus pantotrophus* may be individually wrapped in predetermined amounts of 200 g. Other compositions include a combination of *Paracoccus pantotrophus* in an amount of $1 \times 10^5$ to about $10 \times 10^9$ CFU/gm combined with *Bacillus megaterum* in an amount of $1 \times 10^5$ to about $11 \times 10^9$ CFU/gm. Dry formulations can be individually wrapped or packaged in a predetermined size with a predetermined amount of *Paracoccus pantotrophus* and *Bacillus megaterum* such as $3 \times 10^9$ CFU/gm.

In embodiments, dosages of composition suitable for use in accordance with the present disclosure can be applied to water bodies or soils/sediments for the purposes of preventing $H_2S$ contamination and/or treating $H_2S$ contamination. Suitable application periods and dosage of *Paracoccus pantotrophus* and *Bacillus megaterium* for prevention and treatment for use in accordance with the present disclosure are shown in Table 1 below:

TABLE 1

|  | Application period | Dosage | Tips |
|---|---|---|---|
| Prevention (Prophylactic) | During pond and/or sediment preparation | 1-3 Kg/10,000 $m^2$ for example 2 Kg./10,000 $m^2$ | Spread over the wet pond soil |
|  | After filling pond with marine or aquatic animals, e.g., 35 days post stocking and from 90 days until harvested | 0.5-1.5 kg./10,000 $m^2$; every 7-10 days, for example 1 Kg./10,000 $m^2$; every 7-10 days | Most likely that hydrogen sulfide is commonly produced during the early and late culture period. |
| Treatment | When pond and/or sediment becomes black and/or smells bad | 1-3 kg./10,000 m2; then 0.5-1.5 kg./10,000 $m^2$ 3-4 days after first application - for example 2 kg./10,000 $m^2$; then 1 kg./10,000 m2 3-4 days after first application. | Keep alkalinity above 100 ppm. |

Table 1 shows suitable dosages in accordance with the present disclosure for appoximately 5-10 Kg./10,000 $m^2$/crop. These numbers may be adjusted for a larger pond or sediment area to be treated, and/or large/smaller crop sizes.

The following non-limiting examples further illustrate compositions, methods, and treatments in accordance with the present disclosure. It should be noted that the disclosure is not limited to the specific details embodied in the examples.

Example I

A method of using the bacteria *Paracoccus pantotrophus* for hydrogen sulfide ($H_2S$) control was evaluated in three separate experiments. In Experiment I, $H_2S$ was generated by mixing shrimp pond sediment and shrimp feed for three days. After $H_2S$ was produced, the sludge was divided into 4 groups as follows: control group (no bacterial and sodium nitrate ($NaNO_3$) added); Treatment 1 (200 ppm of $NaNO_3$ added); Treatment 2 (5 ppm of bacteria and 200 ppm of $NaNO_3$ added); Treatment 3 (10 ppm of bacteria and 200 ppm of $NaNO_3$ added). The results show sulfide ($S^{2-}$) and $H_2S$ levels in the control group increased from day one until the end of the study. The level of both, $S^{2-}$ and $H_2S$ in all treatment groups decreased until the nitrate concentration becomes zero, then $S^{2-}$ and $H_2S$ level increased again. However, the lowest level of $S^{2-}$ and $H_2S$ was observed in treatment 2, 3 and 1 respectively.

The results from Experiment I are shown below:
Control group sludge 200 g, shrimp feed 50 g and 800 ml pond water.
Treatment 1 sludge 200 g, shrimp feed 50 g and 800 ml pond water+200 ppm NaNO3 after 3 days.
Treatment 2 sludge 200 g, shrimp feed 50 g and 800 ml pond water+200 ppm NaNO3 and 5 ppm *Paracoccus pantotrophus* after 3 days.
Treatment 3 sludge 200 g, shrimp feed 50 g and 800 ml pond water+200 ppm NaNO3 and 10 ppm *Paracoccus pantotrophus* after 3 days.
Sulfide, $H_2S$, and Nitrate levels for Experiment I are shown below in Table 2.

TABLE 2

Mean ± SD of Sulfide, Hydrogen sulfide and Nitrate from Control and Experimental groups.

| DAY | PARAMETER | CONTROL | TREATMENT 1 | TREATMENT 2 | TREATMENT 3 |
|---|---|---|---|---|---|
| 0 | Sulfide | 3.75 ± 0.00$^a$ | 3.75 ± 0.00$^a$ | 3.75 ± 0.00$^a$ | 3.75 ± 0.00$^a$ |
|  | $H_2S$ | 3.98 ± 0.00$^a$ | 3.98 ± 0.00$^a$ | 3.98 ± 0.00$^a$ | 3.98 ± 0.00$^a$ |
|  | Nitrate | 0.00 | 0.00 | 0.00 | 0.00 |
| 1 | Sulfide | 4.50 ± 0.25$^c$ | 3.67 ± 0.14$^{bc}$ | 3.33 ± 0.29$^{ab}$ | 2.50 ± 0.50$^a$ |
|  | $H_2S$ | 4.77 ± 0.27$^c$ | 3.89 ± 0.16$^{bc}$ | 3.53 ± 0.31$^{ab}$ | 2.65 ± 0.53$^a$ |
|  | Nitrate | 0.00$^a$ | 10.00 ± 0.00$^b$ | 10.00 ± 0.00$^b$ | 10.00 ± 0.00$^b$ |
| 2 | Sulfide | 4.75 ± 0.25$^d$ | 3.50 ± 0.25$^c$ | 2.92 ± 0.38$^b$ | 1.50 ± 0.00$^a$ |
|  | $H_2S$ | 5.04 ± 0.27$^d$ | 3.71 ± 0.27$^c$ | 3.09 ± 0.41$^b$ | 1.59 ± 0.00$^a$ |
|  | Nitrate | 0.00$^a$ | 5.00 ± 0.00$^b$ | 5.00 ± 0.00$^b$ | 2.50 ± 0.00$^b$ |
| 3 | Sulfide | 5.00 ± 0.25$^d$ | 3.17 ± 0.38$^c$ | 2.08 ± 0.14$^b$ | 1.25 ± 0.00$^a$ |
|  | $H_2S$ | 5.30 ± 0.27$^d$ | 3.36 ± 0.40$^c$ | 2.21 ± 0.16$^b$ | 1.33 ± 0.00$^a$ |
|  | Nitrate | 0.00$^a$ | 5.00 ± 0.00$^b$ | 2.50 ± 0.00$^b$ | 0.00$^a$ |
| 4 | Sulfide | 5.50 ± 0.00$^c$ | 2.33 ± 0.29$^b$ | 1.00 ± 0.87$^a$ | 1.67 ± 0.29$^{ab}$ |
|  | $H_2S$ | 5.83 ± 0.00$^c$ | 2.47 ± 0.31$^b$ | 1.06 ± 0.92$^a$ | 1.80 ± 0.28$^{ab}$ |
|  | Nitrate | 0.00$^a$ | 2.50 ± 0.00$^b$ | 0.00$^a$ | 0.00$^a$ |
| 5 | Sulfide | 5.67 ± 0.14$^b$ | 2.17 ± 0.29$^a$ | 1.50 ± 0.00$^a$ | 2.08 ± 0.63$^a$ |
|  | $H_2S$ | 6.01 ± 0.16$^b$ | 2.30 ± 0.31$^a$ | 1.59 ± 0.00$^a$ | 2.21 ± 0.67$^a$ |
|  | Nitrate | 0.00$^a$ | 0.00$^a$ | 0.00$^a$ | 0.00$^a$ |

TABLE 2-continued

Mean ± SD of Sulfide, Hydrogen sulfide and Nitrate from Control and Experimental groups.

| DAY | PARAMETER | CONTROL | TREATMENT 1 | TREATMENT 2 | TREATMENT 3 |
|---|---|---|---|---|---|
| 6 | Sulfide | $6.17 \pm 0.14^b$ | $2.58 \pm 1.13^a$ | $1.83 \pm 0.29^a$ | $3.00 \pm 0.25^a$ |
|   | $H_2S$ | $6.54 \pm 0.16^b$ | $2.69 \pm 1.21^a$ | $1.94 \pm 0.31^a$ | $3.18 \pm 0.27^a$ |
|   | Nitrate | $0.00^a$ | $0.00^a$ | $0.00^a$ | $0.00^a$ |
| 7 | Sulfide | $6.50 \pm 0.25^c$ | $3.17 \pm 0.38^b$ | $2.00 \pm 0.50^a$ | $3.50 \pm 0.25^b$ |
|   | $H_2S$ | $6.89 \pm 0.27^c$ | $3.36 \pm 0.40^b$ | $2.12 \pm 0.53^a$ | $3.71 \pm 0.27^b$ |
|   | Nitrate | $0.00^a$ | $0.00^a$ | $0.00^a$ | $0.00^a$ |

Note:
Numbers with different letters indicate a statistically significant difference $P < 0.05$.

Experiment 2 was set up exactly like Experiment I, except that shrimp pond sediment was not mixed with shrimp feed before testing. Sodium nitrate was added to maintain the OMP level for the duration of the experiment. The results showed that the level of $S^{2-}$ and $H_2S$ in control group was increased similar to experiment one. In all of the treatment groups, the level of $S^2$ and $H_2S$ become zero at days 3 from treatment.
Control group sludge 200 g, shrimp feed 50 g and 800 ml pond water
Treatment 1 sludge 200 g, shrimp feed 50 g and 800 ml pond water+200 ppm NaNO3.
Treatment 2 sludge 200 g, shrimp feed 50 g and 800 ml pond water+200 ppm NaNO3 and 5 ppm *Paracoccus pantotrophus*.
Treatment 3 sludge 200 g, shrimp feed 50 g and 800 ml pond water+200 ppm NaNO3 and 10 ppm *Paracoccus pantotrophus*.
The results from Experiment 2 are shown below in Table 3:

In Experiment 3, the concentration of bacteria and sodium nitrate was reduced to 1 ppm *Paracoccus pantotrophus* and 10 ppm of sodium nitrate. Experiment 3 was set up the same as Experiment 2. In Experiment 3, an increase of $S^{2-}$ and $H_2S$ level was observed in control group when compared to Experiment 2. Further, in Experiment 3, $S^{2-}$ and $H_2S$ level became zero on day 4. The level of $S^{2-}$ and $H_2S$ was increased in treatment 1 and 2 but was still lower than the control group.
Control group sludge 200 g, shrimp feed 50 g and 800 ml pond water
Treatment 1 sludge 200 g, shrimp feed 50 g and 800 ml pond water+10 ppm NaNO3
Treatment 2 sludge 200 g, shrimp feed 50 g and 800 ml pond water+1 ppm *Paracoccus pantotrophus*
Treatment 3 sludge 200 g, shrimp feed 50 g and 800 ml pond water+10 ppm NaNO3 and 1 ppm *Paracoccus pantotrophus*
The results from Experiment III are shown below in Table 4:

TABLE 3

Mean ± SD of Sulfide, Hydrogen sulfide and Nitrate from Control and Experimental groups.

| DAY | PARAMETER | CONTROL | TREATMENT 1 | TREATMENT 2 | TREATMENT 3 |
|---|---|---|---|---|---|
| 0 | Sulfide | $0.00^a$ | $0.00^a$ | $0.00^a$ | $0.00^a$ |
|   | $H_2S$ | $0.00^a$ | $0.00^a$ | $0.00^a$ | $0.00^a$ |
|   | Nitrate | $0.00^a$ | $0.00^a$ | $0.00^a$ | $0.00^a$ |
| 1 | Sulfide | $1.00 \pm 0.00^a$ | $0.75 \pm 0.00^a$ | $0.75 \pm 0.00^a$ | $0.50 \pm 0.00^a$ |
|   | $H_2S$ | $1.06 \pm 0.00^a$ | $0.77 \pm 0.06^a$ | $0.80 \pm 0.00^a$ | $0.53 \pm 0.00^a$ |
|   | Nitrate | $0.00^a$ | $10.00 \pm 0.00^b$ | $10.00 \pm 0.00^b$ | $10.00 \pm 0.00^b$ |
| 2 | Sulfide | $1.25 \pm 0.00^c$ | $1.08 \pm 0.14^b$ | $0.33 \pm 0.29^a$ | $0.17 \pm 0.29^a$ |
|   | $H_2S$ | $1.33 \pm 0.00^c$ | $1.15 \pm 0.16^b$ | $0.35 \pm 0.31^a$ | $0.18 \pm 0.31^a$ |
|   | Nitrate | $0.00^a$ | $10.00 \pm 0.00^b$ | $10.00 \pm 0.00^b$ | $10.00 \pm 0.00^b$ |
| 3 | Sulfide | $1.33 \pm 0.14^b$ | $0.00^a$ | $0.00^a$ | $0.00^a$ |
|   | $H_2S$ | $1.42 \pm 0.15^b$ | $0.00^a$ | $0.00^a$ | $0.00^a$ |
|   | Nitrate | $0.00^a$ | $10.00 \pm 0.00^b$ | $10.00 \pm 0.00^b$ | $10.00 \pm 0.00^b$ |
| 4 | Sulfide | $1.50 \pm 0.00^b$ | $0.00^a$ | $0.00^a$ | $0.00^a$ |
|   | $H_2S$ | $1.59 \pm 0.00^b$ | $0.00^a$ | $0.00^a$ | $0.00^a$ |
|   | Nitrate | $0.00^a$ | $10.00 \pm 0.00^b$ | $10.00 \pm 0.00^b$ | $10.00 \pm 0.0^b$ |
| 5 | Sulfide | $2.17 \pm 0.29^b$ | $0.00^a$ | $0.00^a$ | $0.00^a$ |
|   | $H_2S$ | $2.30 \pm 0.31^b$ | $0.00^a$ | $0.00^a$ | $0.00^a$ |
|   | Nitrate | $0.00^a$ | $10.00 \pm 0.00^b$ | $10.00 \pm 0.00^b$ | $10.00 \pm 0.00^b$ |
| 6 | Sulfide | $2.75 \pm 0.25^b$ | $0.00^a$ | $0.00^a$ | $0.00^a$ |
|   | $H_2S$ | $2.92 \pm 0.27^b$ | $0.00^a$ | $0.00^a$ | $0.00^a$ |
|   | Nitrate | $0.00^a$ | $10.00 \pm 0.00^b$ | $10.00 \pm 0.00^b$ | $10.00 \pm 0.00^b$ |
| 7 | Sulfide | $2.83 \pm 0.14^b$ | $0.00^a$ | $0.00^a$ | $0.00^a$ |
|   | $H_2S$ | $3.01 \pm 0.15^b$ | $0.00^a$ | $0.00^a$ | $0.00^a$ |
|   | Nitrate | $0.00^a$ | $10.00 \pm 0.00^b$ | $10.00 \pm 0.00^b$ | $10.00 \pm 0.00^b$ |

Note:
Numbers with different letters indicate a statistically significant difference $P < 0.05$.

TABLE 4

Mean ± SD of Sulfide, Hydrogen sulfide and Nitrate from Control and Experimental groups.

| DAY | PARAMETER | CONTROL | TREATMENT 1 | TREATMENT 2 | TREATMENT 3 |
|---|---|---|---|---|---|
| 0 | Sulfide | $0.00^a$ | $0.00^a$ | $0.00^a$ | $0.00^a$ |
|   | $H_2S$ | $0.00^a$ | $0.00^a$ | $0.00^a$ | $0.00^a$ |
|   | Nitrate | $0.00^a$ | $0.00^a$ | $0.00^a$ | $0.00^a$ |
| 1 | Sulfide | $1.25 \pm 0.25^a$ | $1.08 \pm 0.14^a$ | $1.00 \pm 0.25^a$ | $1.42 \pm 0.14^a$ |
|   | $H_2S$ | $1.33 \pm 0.27^a$ | $1.15 \pm 0.16^a$ | $1.06 \pm 0.27^a$ | $1.50 \pm 0.15^a$ |
|   | Nitrate | $0.00^a$ | $10.00 \pm 0.00^b$ | $0.00^a$ | $10.00 \pm 0.00^b$ |
| 2 | Sulfide | $1.33 \pm 0.14^a$ | $1.17 \pm 0.14^a$ | $1.00 \pm 0.25^a$ | $1.25 \pm 0.25^a$ |
|   | $H_2S$ | $1.42 \pm 0.15^a$ | $1.24 \pm 0.16^a$ | $1.06 \pm 0.27^a$ | $1.33 \pm 0.27^a$ |
|   | Nitrate | $0.00^a$ | $10.00 \pm 0.00^b$ | $0.00^a$ | $10.00 \pm 0.00^b$ |
| 3 | Sulfide | $1.42 \pm 0.14^a$ | $1.25 \pm 0.25^a$ | $1.17 \pm 0.29^a$ | $1.17 \pm 0.29^a$ |
|   | $H_2S$ | $1.50 \pm 0.15^a$ | $1.33 \pm 0.27^a$ | $1.24 \pm 0.31^a$ | $1.24 \pm 0.31^a$ |
|   | Nitrate | $0.00^a$ | $10.00 \pm 0.00^b$ | $0.00^a$ | $10.00 \pm 0.00^b$ |
| 4 | Sulfide | $1.50 \pm 0.25^b$ | $1.33 \pm 0.38^b$ | $1.42 \pm 0.29^b$ | $0.00^a$ |
|   | $H_2S$ | $1.59 \pm 0.27^b$ | $1.42 \pm 0.41^b$ | $1.51 \pm 0.31^b$ | $0.00^a$ |
|   | Nitrate | $0.00^a$ | $10.00 \pm 0.00^b$ | $0.00^a$ | $10.00 \pm 0.00^b$ |
| 5 | Sulfide | $1.92 \pm 0.14^b$ | $1.58 \pm 0.52^b$ | $1.67 \pm 0.14^b$ | $0.00^a$ |
|   | $H_2S$ | $2.03 \pm 0.15^b$ | $1.68 \pm 0.55^b$ | $1.77 \pm 0.16^b$ | $0.00^a$ |
|   | Nitrate | $0.00^a$ | $10.00 \pm 0.00^b$ | $0.00^a$ | $10.00 \pm 0.00^b$ |
| 6 | Sulfide | $2.33 \pm 0.14^c$ | $1.75 \pm 0.25^b$ | $1.67 \pm 0.29^b$ | $0.00^a$ |
|   | $H_2S$ | $2.48 \pm 0.15^c$ | $1.86 \pm 0.27^b$ | $1.77 \pm 0.31^b$ | $0.00^a$ |
|   | Nitrate | $0.00^a$ | $10.00 \pm 0.00^b$ | $0.00^a$ | $10.00 \pm 0.00^b$ |
| 7 | Sulfide | $2.58 \pm 0.38^c$ | $1.92 \pm 0.14^b$ | $1.75 \pm 0.25^b$ | $0.00^a$ |
|   | $H_2S$ | $2.74 \pm 0.40^c$ | $2.03 \pm 0.15^b$ | $1.86 \pm 0.27^b$ | $0.00^a$ |
|   | Nitrate | $0.00^a$ | $10.00 \pm 0.00^b$ | $0.00^a$ | $10.00 \pm 0.00^b$ |

Note:
Numbers with different letters indicate a statistically significant difference $P < 0.05$.

The results of Experiments I, II, and III show that *Paracoccus pantotrophus* can be used to control $H_2S$ generated by shrimp pond sediment alone, or mixed with shrimp feed. Nitrate was needed to support the bacterial activity, however typical shrimp ponds naturally contain nitrate at levels greater than 10 ppm. The results demonstrate that the bacteria can be useful when applied to a shrimp or fish pond or sediment.

Example III

A study was performed to observe the effect of *Paracoccus pantotrophus* for controlling hydrogen sulfide ($H_2S$) and $NaNO_3$ under laboratory conditions. $H_2S$ was prepared by mixing 200 g of pond soil sludge and 50 g of shrimp feed in 1,000 ml flask for three days. The mixture was divided into four treatments and 3 replicates and treated as follows:

Group 1 Control with no treatment
Group 2 $NaNO_3$ was added to 200 ppm
Group 3 *Paracoccus pantotrophus* added to 5 ppm and $NaNO_3$ was added to 200 ppm
Group 4 *Paracoccus pantotrophus* added to 5 ppm and $NaNO_3$ was added to 200 ppm Table 5 shows the results of the study:

TABLE 5

| Day | Parameter | Group1 | Group2 | Group3 | Group4 |
|---|---|---|---|---|---|
| 0 | Hydrogen sulfide | $3.98 \pm 0.00^a$ | $3.98 \pm 0.00^a$ | $3.98 \pm 0.00^a$ | $3.98 \pm 0.00^a$ |
|   | Nitrate | $0.00^a$ | 0.00 | 0.00 | $0.00^a$ |
| 1 | Hydrogen sulfide | $4.77 \pm 0.27^c$ | $3.89 \pm 0.16^{bc}$ | $3.53 \pm 0.31^{ab}$ | $2.65 \pm 0.53^a$ |
|   | Nitrate | $0.00^a$ | $10.00 \pm 0.00^b$ | $10.00 \pm 0.00^b$ | $10.00 \pm 0.00^b$ |
| 2 | Hydrogen sulfide | $5.04 \pm 0.27^d$ | $3.71 \pm 0.27^c$ | $3.09 \pm 0.41^b$ | $1.59 \pm 0.00^a$ |
|   | Nitrate | $0.00^a$ | $5.00 \pm 0.00^b$ | $5.00 \pm 0.00^b$ | $2.50 \pm 0.00^b$ |
| 3 | Hydrogen sulfide | $5.30 \pm 0.27^d$ | $3.36 \pm 0.40^c$ | $2.21 \pm 0.16^b$ | $1.33 \pm 0.00^a$ |
|   | Nitrate | $0.00^a$ | $5.00 \pm 0.00^b$ | $2.50 \pm 0.00^b$ | $0.00^a$ |
| 4 | Hydrogen sulfide | $5.83 \pm 0.00^c$ | $2.47 \pm 0.31^b$ | $1.06 \pm 0.92^a$ | $1.80 \pm 0.28^{ab}$ |
|   | Nitrate | $0.00^a$ | $2.50 \pm 0.00^b$ | $0.00^a$ | $0.00^a$ |
| 5 | Hydrogensulfide | $6.01 \pm 0.16^b$ | $2.30 \pm 0.31^a$ | $1.59 \pm 0.00^a$ | $2.21 \pm 0.67^a$ |
|   | Nitrate | $0.00^a$ | $0.00^a$ | $0.00^a$ | $0.00^a$ |
| 6 | Hydrogen sulfide | $6.54 \pm 0.16^b$ | $2.69 \pm 1.21^a$ | $1.94 \pm 0.31^a$ | $3.18 \pm 0.27^a$ |
|   | Nitrate | $0.00^a$ | $0.00^a$ | $0.00^a$ | $0.00^a$ |
| 7 | Hydrogen sulfide | $6.89 \pm 0.27^c$ | $3.36 \pm 0.40^b$ | $2.12 \pm 0.53^a$ | $3.71 \pm 0.27^b$ |
|   | Nitrate | $0.00^a$ | $0.00^a$ | $0.00^a$ | $0.00^a$ |

Note:
Numbers with different letters indicate a statistically significant difference $P < 0.05$.

The study showed that $H_2S$ concentration was increased in control group from start to finish. The concentration of $H_2S$ was reduced until the $NO_3^-$ concentration was reduced to zero in the experimental groups 2, 3 and 4 after the $H_2S$ concentration was increased.

Example IV

A study was conducted to examine the suitable quantity of bacteria necessary to prevent $H_2S$ production.

200 g of pond soil sludge and 50 g of shrimp feed was mixed in a 1,000 ml flask. The mixture was divided into 5 treatments with 3 replicates and treated as follows:
Group 1 Control with no treatment
Group 2 $NaNO_3$ was added to 10 ppm
Group 3 *Paracoccus pantotrophus* added to 0.1 ppm and $NaNO_3$ was added to 10 ppm
Group 4 *Paracoccus pantotrophus* added to 1 ppm and $NaNO_3$ was added to 10 ppm
Group 5 *Paracoccus* pantotrophus added to 5 ppm and $NaNO_3$ was added to 10 ppm
Group 6 *Paracoccus pantotrophus* added to 10 ppm and $NaNO_3$ was added to 10 ppm.
$NaNO_3$ was added to all flasks in 3-5 g to maintain at 10 ppm for 7 days.
$H_2S$ was measured every day for seven days using Hach kits (U.S.A.). The results are shown in Table 6.

TABLE 6

| Days | parameter | group 1 | group 2 | group 3 | group 4 | Group 5 | group 6 |
|---|---|---|---|---|---|---|---|
| 0 | $H_2S$ | $0.00^a$ | $0.00^a$ | $0.00^a$ | $0.00^a$ | $0.00^a$ | $0.00^a$ |
|   | $NO_3^-$ | $0.00^a$ | $0.00^a$ | $0.00^a$ | $0.00^a$ | $0.00^a$ | $0.00^a$ |
| 1 | $H_2S$ | $1.33 \pm 0.27^b$ | $1.42 \pm 0.41^b$ | $1.59 \pm 0.00^b$ | $1.50 \pm 0.15^b$ | $0.80 \pm 0.00^a$ | $0.53 \pm 0.00^a$ |
|   | $NO_3^-$ | $0.00^a$ | $10.00 \pm 0.00^b$ | $10.00 \pm 0.00^b$ | $10.00 \pm 0.00^b$ | $10.00 \pm 0.00^b$ | $10.00 \pm 0.00^b$ |
| 2 | $H_2S$ | $1.42 \pm 0.15^b$ | $1.33 \pm 0.27^b$ | $1.42 \pm 0.15^b$ | $1.33 \pm 0.27^b$ | $0.35 \pm 0.31^a$ | $0.18 \pm 0.31^a$ |
|   | $NO_3^-$ | $0.00^a$ | $10.00 \pm 0.00^b$ | $10.00 \pm 0.00^b$ | $10.00 \pm 0.00^b$ | $10.00 \pm 0.00^b$ | $10.00 \pm 0.00^b$ |
| 3 | $H_2S$ | $1.50 \pm 0.15^c$ | $1.24 \pm 0.16^b$ | $1.33 \pm 0.27^b$ | $1.24 \pm 0.31^b$ | $0.00^a$ | $0.00^a$ |
|   | $NO_3^-$ | $0.00^a$ | $10.00 \pm 0.00^b$ | $10.00 \pm 0.00^b$ | $10.00 \pm 0.00^b$ | $0.00^b$ | $0.00^b$ |
| 4 | $H_2S$ | $1.59 \pm 0.27^c$ | $1.15 \pm 0.16^b$ | $0.00^b$ | $0.00^a$ | $0.00^a$ | $0.00^a$ |
|   | $NO_3^-$ | $0.00^a$ | $10.00 \pm 0.00^b$ | $0.00^b$ | $0.00^b$ | $0.00^b$ | $0.00^b$ |
| 5 | $H_2S$ | $2.03 \pm 0.15^c$ | $1.33 \pm 0.27^b$ | $0.00^a$ | $0.00^a$ | $0.00^a$ | $0.00^a$ |
|   | $NO_3^-$ | $0.00^a$ | $10.00 \pm 0.00^b$ | $10.00 \pm 0.00^b$ | $10.00 \pm 0.00^b$ | $10.00 \pm 0.00^b$ | $10.00 \pm 0.00^b$ |
| 6 | $H_2S$ | $2.48 \pm 0.15^c$ | $1.42 \pm 0.41^b$ | $0.00^a$ | $0.00^a$ | $0.00^a$ | $0.00^a$ |
|   | $NO_3^-$ | $0.00^a$ | $10.00 \pm 0.00^b$ | $10.00 \pm 0.00^b$ | $10.00 \pm 0.00^b$ | $10.00 \pm 0.00^b$ | $10.00 \pm 0.00^b$ |
| 7 | $H_2S$ | $2.74 \pm 0.40^c$ | $1.68 \pm 0.55^b$ | $0.00^a$ | $0.00^a$ | $0.00^a$ | $0.00^a$ |
|   | $NO_3^-$ | $0.00^a$ | $10.00 \pm 0.00^b$ | $10.00 \pm 0.00^b$ | $10.00 \pm 0.00^b$ | $10.00 \pm 0.00^b$ | $10.00 \pm 0.00^b$ |

Note:
Numbers with different letters indicate a statistically significant difference $P < 0.05$.

Table 6 shows $H_2S$ concentration increased in group 1 (control group) from the started of the experiment to the end of experiment. In Group 2, the production of $H_2S$ was reduced until day 4. In group 3 and 4, $H_2S$ was reduced to zero within 4 days. In group 5 and group 6 the production of $H_2S$ was reduced to zero within only 3 days. This trial revealed that bacteria levels of at least 0.1 ppm can be an effective amount to control the concentration of $H_2S$ build up from shrimp pond sludge mixed with shrimp feed.

Accordingly the bacteria *P. pantotrophus* can be used to control the concentration of $H_2S$ build up from shrimp pond sludge mixed with shrimp feed. An optimum concentration of $NaNO_3$ may be necessary for bacterial process to occur continuously. The results from this study can be apply and used in shrimp pond or with other marine or aquatic animals.

Example V

Tests were performed to observe the effect of a composition which comprises or consists of a mixture of *Paracoccus pantotrophus* and *Bacillus megaterium* on the growth, survival and production of white shrimp cultured in low salinity condition, and to observe the effect of the admixture on the water quality of a shrimp pond.

Materials and Methods

An admixture of *Paracoccus pantotrophus* and *Bacillus megaterium* having a weight ratio of 1.5 to 2.5 was provided (CFU/g was approximately $3 \times 10^9$).

A private shrimp farm having low salinity condition was provided in Bangkok, Thailand with a closed-recirculation system. Six separate ponds were provided and divided into two groups. Group I included 3 ponds treated with the admixture. Group II included 3 ponds similar to the Group I ponds, except no admixture was added to these ponds. All ponds had an area of 4,000 $m^2$ and the water depth of approximately 1.5 to 1.8 meters (m). The admixture was applied to the treated ponds every 7 days until harvest to maintain the concentration of bacteria therein at about 0.1 ppm. No additional treatments were applied to Group I. All six ponds were under the same management until harvest. The stocking density of the shrimp was 40 PL/$M^2$, post larvae, from pathogen free brooders. Commercial pellet were used to feed the shrimp 4 times per day. Ponds were harvested about 4 months after stock.

Studies on Growth, Survival and Yield

Shrimp in each pond were sampled, and measured for average weight every 7 days until harvest (starting at 30 days after pond stock). After the harvest, survival, growth rate, feed conversion ratio and yield were calculated and compared.

Studies on Water Quality

Water samples were collected from all six ponds and the following laboratory tests were conducted at the given time:
1. Dissolved oxygen: 7:00 and 16:00 everyday.
2. Water pH: 7:00 and 16:00 everyday.
3. Salinity: measured once every week.
4. Total alkalinity and hardness: measured once every week
5. Electrical conductivity: once every week
6. Transparency: once every week
7. Total ammonia, nitrite, nitrate and hydrogen sulfide: once every week
8. Redox potential: once every two weeks.

All data were compared with the control ponds using t-test.

Table 7 below relates to the effect of the admixture on growth, survival and production of shrimp as described above. More specifically, Table 7 shows the average body weighs and average daily growth on treated ponds and control ponds.

TABLE 7

| Week | Treated ponds | | Control ponds | |
|---|---|---|---|---|
| | Average body weight (g) | Average daily growth (g/day) | Average body weight (g) | Average daily growth (g/day) |
| 5 | 3.06 | 0.09 | 2.91 | 0.08 |
| 7 | 5.15 | 0.15 | 4.71 | 0.13 |
| 9 | 7.26 | 0.15 | 6.17 | 0.1 |
| 11 | 10.51 | 0.23 | 9.18 | 0.21 |
| 13 | 13.89 | 0.24 | 12.34 | 0.23 |
| 15 | 16.77 | 0.21 | 15.31 | 0.21 |

Results:
The average body weight and average daily growth of shrimp in ponds treated with the admixture were larger than the growth of shrimp in control ponds not treated.

Table 8 below shows a comparison on growth, survival, feed conversion ratio and yield between ponds treated with the admixture in accordance with the present disclosure and non-treated ponds.

TABLE 8

| Pond | Area (M²) | Day of culture (days) | Average body weight (g) | Survival rate (%) | Feed conversion ratio | Yield (Kg/rai) | Average daily growth (g/day) |
|---|---|---|---|---|---|---|---|
| Group I: Treated ponds (with *P. pantotrophus*) | | | | | | | |
| 1 | 2.5 | 111 | 17.24 | 77.33 | 1.22 | 800 | 0.16 |
| 2 | 2.5 | 111 | 16.39 | 89.47 | 1.11 | 880 | 0.15 |
| 3 | 2.5 | 111 | 16.67 | 84.00 | 1.16 | 840 | 0.15 |
| Average | 2.5 | 111 | $16.77 \pm 0.43^a$ | $83.6 \pm 6.08^a$ | $1.16 \pm 0.06^a$ | $840 \pm 40.00^a$ | $0.15 \pm 0.01^a$ |
| Group II: Control ponds (without *P. pantotrophus*) | | | | | | | |
| 4 | 2.5 | 111 | 15.38 | 67.17 | 1.62 | 620 | 0.14 |
| 5 | 2.5 | 111 | 15.63 | 64.00 | 1.62 | 600 | 0.14 |
| 6 | 2.5 | 111 | 14.93 | 75.93 | 1.32 | 680 | 0.13 |
| Average | 2.5 | 111 | $15.31 \pm 0.35^b$ | $69.03 \pm 6.18^b$ | $1.52 \pm 0.17^b$ | $633.33 \pm 41.63^b$ | 0.14 ± 0.01b |

Note: 1 rai = 1,600 M²
Different superscript or letters on the same column indicated significantly different (P < 0.05) on the Table 8.
Results: The average body weight, survival rate, feed conversion ratio and yield were larger in Group I and smaller in Group II.

More specifically, studies showed 33% increase in yield (kg/ha); 9% increase in average body weight (g); 12% improved average daily growth (g/day); 21% improvement in survival rate; 23% reduction in feed conversion ratio.

Studies on the effect of the admixture on water quality in shrimp ponds were conducted. Table 9 below shows the water quality parameters (range and average) in treated and control ponds.

TABLE 9

| Water parameter | | Treated pond with *P. pantotrophus* | | Control pond | |
|---|---|---|---|---|---|
| | | Range | Average | Range | Average |
| Transparency (centimeters) | | 7.0-40.0 | $16.82 \pm 8.00^a$ | 8.0-35.0 | $18.13 \pm 8.57^a$ |
| Water temperature | a.m. | 29.0-30.1 | $29.5 \pm 0.28^a$ | 29.0-29.9 | $29.6 \pm 0.23^a$ |
| (celcius) | p.m. | 31.0-33.5 | $32.0 \pm 0.69^a$ | 30.3-33.5 | $32.0 \pm 0.73^a$ |
| pH | a.m. | 7.61-7.92 | $7.75 - 0.07^a$ | 7.60-7.84 | $7.73 \pm 0.06^a$ |
| | p.m. | 8.24-8.48 | $8.37 \pm 0.05^a$ | 8.22-8.55 | $8.38 \pm 0.06^a$ |
| Dissolved oxygen | a.m. | 4.81-5.37 | $5.08 \pm 0.18^a$ | 4.81-5.30 | $5.03 \pm 0.14^a$ |
| (ppm.) | p.m. | 7.13-9.68 | $8.59 \pm 0.62^b$ | 7.04-9.96 | $8.20 \pm 0.74^a$ |
| Salinity (ppt.) | | 2.60-6.80 | $4.68 \pm 1.30^a$ | 2.80-5.50 | $4.28 \pm 0.87^a$ |
| EC (mcm/cm) | | 4.90-11.87 | $8.30 \pm 2.17^a$ | 5.10-9.86 | $7.69 \pm 1.58^a$ |
| Total alkalinity (ppm.) | | 94-303 | $194 \pm 51^a$ | 93-244 | $182 \pm 38^a$ |
| Hardness (ppm.) | | 758-1826 | $1260 \pm 329^a$ | 772-1532 | $1142 \pm 220^a$ |
| Total ammonia (ppm.) | | 0.006-0.070 | $0.029 \pm 0.013^a$ | 0.004-0.059 | $0.032 \pm 0.015^a$ |
| Nitrite (ppm.) | | 0.000-0.009 | $0.004 \pm 0.002^a$ | 0.001-0.008 | $0.004 \pm 0.002^a$ |
| Hydrogen sulfide(ppm.) | | ND | ND | ND | ND |
| Nitrate (ppm.) | | 2.50-10.00 | $4.39 \pm 2.67^b$ | 2.50-10.00 | $3.11 \pm 1.43^a$ |

Note
Different superscript or letters on the same row, indicated significantly different (P < 0.05).

Table 10 shows the redox potential value in treated and control ponds.

TABLE 10

|  | Treated pond with *P. pantotrophus* admixture | | Control | |
| --- | --- | --- | --- | --- |
| Week | Feeding area (mV) | Pond center (mV) | Feeding area (mV) | Pond center (mV) |
| 2 | −15 | −29 | −53 | −92 |
| 4 | −26 | −45 | −83 | −106 |
| 6 | −42 | −64 | −91 | −111 |
| 8 | −54 | −78 | −84 | −113 |
| 10 | −61 | −86 | −96 | −116 |
| 12 | −52 | −93 | −82 | −124 |
| 14 | −67 | −98 | −102 | −146 |

Example VI

Table 11 shows characteristics of one composition in accordance with the present disclosure.

TABLE 11

| | |
| --- | --- |
| Composition | *Paracoccus pantotrophus* |
| Bacterial Count: | 3.0 billion CFU/g (3.0 × 10E9 CFU/g) |
| Appearance | Tan free flowing powder |
| Odour | Yeast like |
| Optimum pH range | 7.5-8.3 |
| Optimum Temperature Range | 23 C.-40 C. (pond water) |
| Salinity Range | 0-40 ppt |
| Storage & Handling | Optimum temperature for storage 23 C. or below, Avoid direct sunlight Store in cool, dry place |
| Shelf Life | Best when used within 1 year of manufacture date |

It will be understood that various modifications may be made to the embodiments disclosed herein. Therefore, the above description should not be construed as limiting, but merely as exemplifications of embodiments. Those skilled in art will envision other modifications within the scope and spirit of the claims appended hereto.

What is claimed is:

1. A method of treating aquatic or marine animals comprising contacting a water body or sediment thereof with one or more sulfur oxidizing bacteria of the genus *Paracoccus pantotrophus* in an effective amount of about 100 CFU/ml to about 100,000 CFU/ml in the water body or in an effective amount of about 100 CFU/g to about 100,000 CFU/g in the sediment, sufficient to control, reduce, or eliminate the $H_2S$ in the water body or sediment thereof; and modifying the chemistry of the water body or sediment thereof by establishing a concentration of nitrates in the water body or sediment thereof at about 0.01 ppm to about 500 ppm, wherein the water body or sediment thereof comprises one or more aquatic or marine animals and the yield of the aquatic and marine animals is increased in comparison to the same water body or sediment thereof having no sulfur oxidizing bacteria added thereto, and wherein the step of modifying the chemistry of the water body or sediment thereof comprises establishing an oxidation reduction potential level in the water body or in the sediment thereof of at least about ⁻330 mV.

2. The method of claim 1, wherein the water body is an aquaculture, farm, pool, pond, waste lagoon, paddy, lake, estuary, ocean, or combinations thereof.

3. The method of claim 1, wherein the water body is an aquaculture.

4. The method of claim 1, wherein the water body is a farm.

5. The method of claim 1, wherein the water body is a pool.

6. The method of claim 1, wherein the water body is a pond.

7. The method of claim 1, wherein the contacting comprises contacting an anaerobic zone within the water body or sediment thereof.

8. The method of claim 1, wherein said concentration of nitrates in the water body or sediment thereof is at about 1 ppm to about 250 ppm.

9. The method of claim 1, wherein said concentration of nitrates in the water body or sediment thereof is at about 200 ppm.

10. The method of claim 1, further comprising stocking the water body with aquatic or marine animals comprising fish, shrimp, lobster, eel, crayfish, bottom dwelling fish, finfish, prawns, oysters, mussels, cockles, mollusks, or combinations thereof.

11. The method of claim 1, further comprising stocking the water body with fish.

12. The method of claim 1, further comprising stocking the water body with shrimp.

13. The method of claim 1, further comprising stocking the water body with lobster.

14. The method of claim 1, wherein the effective amount of *Paracoccus pantotrophus* is an amount sufficient to maintain $H_2S$ below 1 ppm for at least 1 week.

15. The method of claim 1, further comprising adding to the water body or sediment thereof an additional microorganism of genus *Bacillus* selected from the group consisting of *Bacillus alkalophilus*, *Bacillus brevis*, *Bacillus coagulans*, *Bacillus circulans*, *Bacillus clausii*, *Bacillus licheniformis*, *Bacillus lentus*, *Bacillus amyoliquofaciens*, *Bacillus lautus*, *Bacillus megaterium*, *Bacillus subtilus*, *Bacillus stearothermophilus*, *Bacillus pumilus*, *Bacillus pasteurii*, *Bacillus thuringiensis*, and combinations thereof.

16. The method of claim 1, wherein the yield of the aquatic or marine animal is increased by at least 5% in comparison to the same water body having no sulfur oxidizing bacteria added thereto.

17. A method for increasing aquatic and marine animal yield in a water body comprising reducing the amount of $H_2S$ in a water body and sediment thereof by establishing a sulfur oxidizing bacteria population of *Paracoccus pantotrophus* in the water body in an effective amount of about 100 CFU/ml to about 100,000 CFU/ml and in the sediment in an effective amount of about 100 CFU/g to about 100,000 CFU/g; and modifying the chemistry of the water body by establishing a concentration of nitrates in the water body at about 0.01 ppm to about 500 ppm, wherein the water body comprises one or more aquatic or marine animals and wherein the step of modifying the chemistry of the water body comprises establishing an oxidation reduction potential level in the water body or sediment thereof of at least about ⁻330 mV.

18. The method of claim 17, wherein the final amount of $H_2S$ in the water body is below 1 ppm.

19. The method of claim 17, wherein the final amount of $H_2S$ in the water body or sediment is below 0.5 ppm.

20. The method of claim 17, wherein the final amount of $H_2S$ in the water body or sediment is 0.1 ppm to 0.5 ppm.

21. The method of claim 17, further comprising establishing a pH in the water body of about 6.0 to 9.0.

22. The method of claim 17, wherein the step of reducing the amount of $H_2S$ in a water body and sediment thereof occurs in an anaerobic zone within the water body.

23. The method of claim 17, further comprising stocking the water body with aquatic or marine animals comprising fish, shrimp, lobster, eel, crayfish, bottom dwelling fish, finfish, prawns, oysters, mussels, cockles, mollusks, or combinations thereof.

24. The method of claim 17, further comprising stocking the water body with fish.

25. The method of claim 17, further comprising stocking the water body with shrimp.

26. The method of claim 17, further comprising stocking the water body with lobster.

27. The method of claim 17, further comprising adding to the water body or sediment thereof an additional microorganism of the genus *Bacillus* selected from the group consisting of *Bacillus alkalophilus, Bacillus brevis, Bacillus coagulans, Bacillus circulans, Bacillus clausii, Bacillus licheniformis, Bacillus lentus, Bacillus amyoliquofaciens, Bacillus lautus, Bacillus megaterium, Bacillus subtilus, Bacillus stearothermophilus, Bacillus pumilus, Bacillus pasteurii, Bacillus thuringiensis*, and combinations thereof.

28. The method of claim 17, wherein the yield of the aquatic or marine animal is increased by at least 5%.

* * * * *

UNITED STATES PATENT AND TRADEMARK OFFICE
CERTIFICATE OF CORRECTION

PATENT NO. : 9,260,332 B2  Page 1 of 1
APPLICATION NO. : 12/099877
DATED : February 16, 2016
INVENTOR(S) : Drahos et al.

It is certified that error appears in the above-identified patent and that said Letters Patent is hereby corrected as shown below:

Claims

Column 24, In Claim 15, line 7, please delete "*subtilus*" and insert --*subtilis*--.

Column 25, In Claim 27, line 7, please delete "*subtilus*" and insert --*subtilis*--.

Signed and Sealed this
Second Day of August, 2016

Michelle K. Lee
*Director of the United States Patent and Trademark Office*